No. 783,934. PATENTED FEB. 28, 1905.
D. A. DODD.
MACHINE FOR EXTRACTING DUPLICATE PHONOGRAPH RECORDS.
APPLICATION FILED FEB. 26, 1903.
2 SHEETS—SHEET 1.
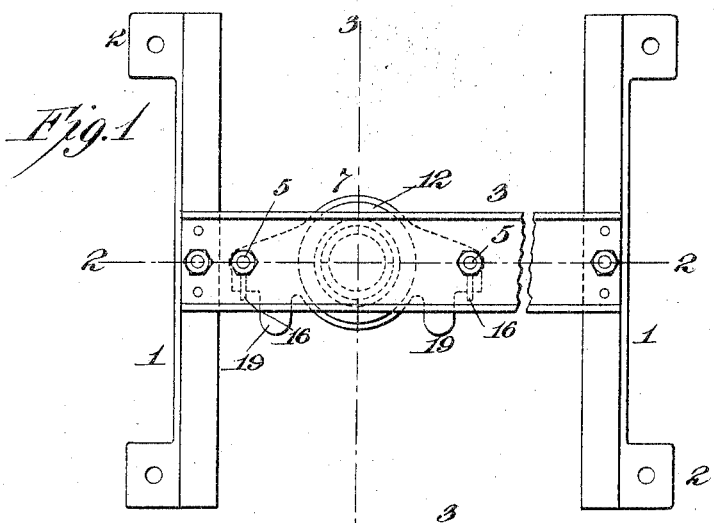
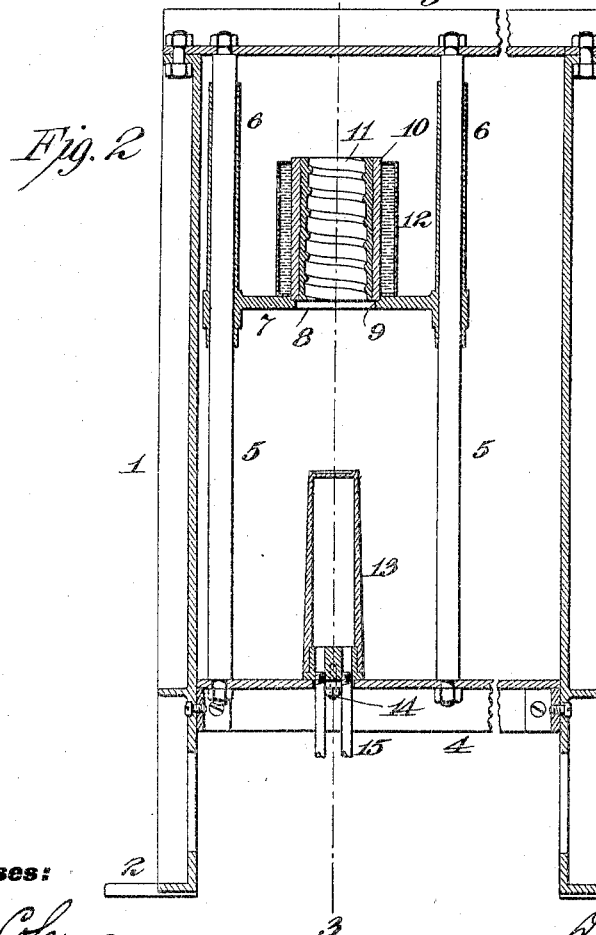
Witnesses: Inventor
Jas. F. Coleman David A. Dodd
Jno. Robt Taylor by Dyer & Dyer
Attorneys No. 783,934. PATENTED FEB. 28, 1905.
D. A. DODD.
MACHINE FOR EXTRACTING DUPLICATE PHONOGRAPH RECORDS.
APPLICATION FILED FEB. 26, 1903.
2 SHEETS—SHEET 2.
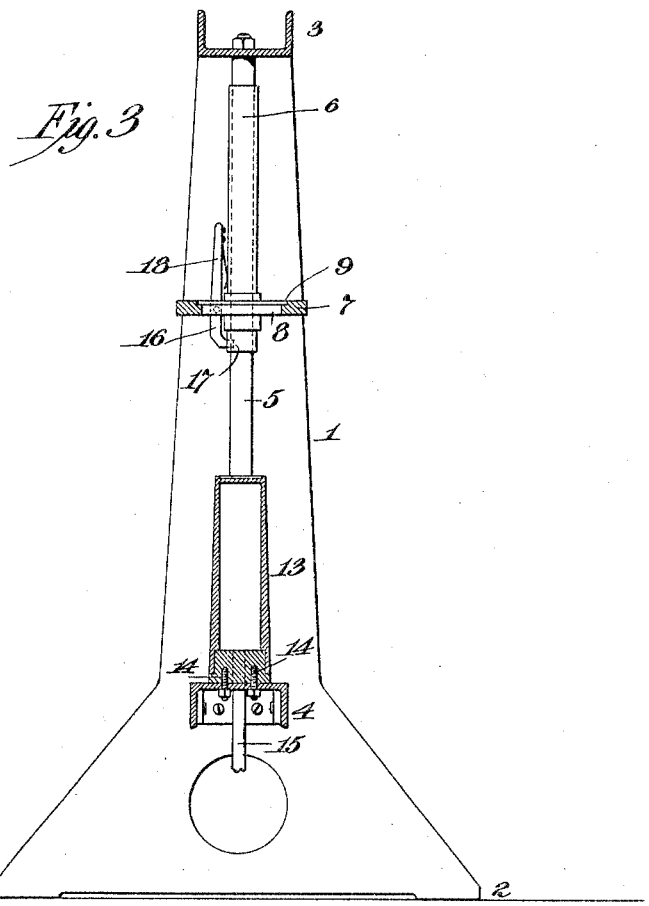
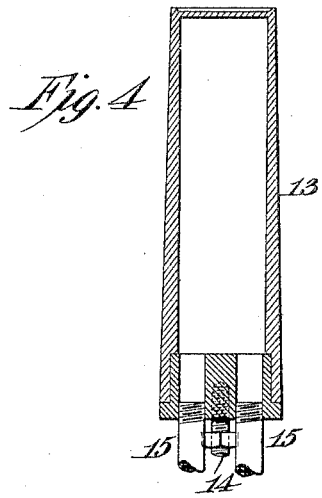
Witnesses:
Jas. F. Coleman
Jno. Rob't Taylor
Inventor
David A. Dodd
by Dyer & Dyer
Attorneys No. 783,934. Patented February 28, 1905.

UNITED STATES PATENT OFFICE.

DAVID A. DODD, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MACHINE FOR EXTRACTING DUPLICATE PHONOGRAPH-RECORDS.

SPECIFICATION forming part of Letters Patent No. 783,934, dated February 28, 1905.

Application filed February 26, 1903. Serial No. 145,204.

*To all whom it may concern:*

Be it known that I, DAVID A. DODD, a citizen of the United States, residing at East Orange, in the county of Essex and State of New Jersey, have invented a certain new and useful Improvement in Machines for Extracting Duplicate Phonograph-Records, of which the following is a specification.

In the production of duplicate phonograph-records from molds by suitable casting or allied processes the removal of a finished duplicate from the mold is an operation which requires some delicacy of manipulation, owing to the fragile nature of the wax-like material and to the extremely minute character of the record-surfaces. It is therefore desirable that after the duplicate record has contracted sufficiently to clear the mold the separation of the two should be effected so as to not scratch the record in its withdrawal. It is also desirable in this art to effect a relatively rapid but uniform cooling of the duplicate record in order that it may not be warped or cracked.

My present invention presents a machine for extracting duplicate records from molds in a simple and expeditious manner; and my object is to provide a machine for the purpose by which duplicate records may be removed from the molds in which they are produced without scratching or injuring the record-surface in any way and by which in addition a relatively rapid but uniform cooling of the record can be effected.

To this end the invention consists, broadly, in providing an artificially-cooled mandrel or extractor over which the record within the mold is introduced, by which it is held, and in combining therewith suitable appliances for effecting a relative longitudinal separation of the record and mold after the record has contracted sufficiently to enable it to be extracted from the mold.

In order that the invention may be better understood, attention is directed to the accompanying drawings, forming a part of this specification, in which—

Figure 1 is a plan view of my improved apparatus; Fig. 2, a longitudinal sectional view on the line 2 2 of Fig. 1; Fig. 3, a vertical sectional view on the line 3 3 of Fig. 2, and Fig. 4 a sectional view of the mandrel or extractor on an enlarged scale.

In all of the above views corresponding parts are represented by the same numerals of reference.

The device comprises two side frames 1 1, having feet 2 secured to a suitable base or foundation, a top member 3, and an intermediate mandrel-supporting member 4. The members 3 and 4 are made, preferably, of channel-irons, as shown, secured in position in any suitable way. These horizontal members 3 and 4 of the apparatus are preferably made sufficiently long to accommodate a series of the record-extracting devices; but I show them broken away and illustrate only one of the core-extracting devices. Extending between the horizontal members 3 and 4 of the frame are vertical guides 5 5, on which work sleeves 6 6. Extending between these sleeves is a platform 7, having a central opening 8 and formed with a shoulder 9 for receiving the mold 10, from which the record 11 is to be removed. The opening 8 in the platform is large enough to permit the record to pass through the same.

Ordinarily I insert the mold 10, carrying the record therein, within a hollow jacket 12, filled with cold water, so as to cool the mold and facilitate the shrinking of the record as well as to chill the record-surfaces thereof. The mold 10 and jacket 12 are slightly tapered and are engaged frictionally. Carried by the horizontal member 4 of the frame is a hollow mandrel or extractor 13, secured in place by screws 14 and having pipes 15 leading into the same and through which cold water circulates, so that the core will be always kept artificially cool.

In order to lock the platform 7 in a normally elevated position, I provide a latch 16 on one or both of the sleeves 6. This latch engages a notch 17 in the vertical guide 5 and is impelled into this engagement by a spring 18, engaging under the tail thereof. Ordinarily the platform 7 is provided with lugs 19, constituting finger-pieces by which it may be elevated.

In operation I proceed as follows: The platform 7 is elevated and locked by the latch or latches 16 in this position. A mold carrying a duplicate record therein is now preferably inclosed in the water-jacket 12 and inserted in position within the shoulder 9 of the platform 7. The use of the water-jacket 12 facilitates the chilling of the material. The latch or latches 16 are now released, permitting the platform to descend, whereby the extractor will enter the mold and will tend to chill the record therein. As soon as the record has contracted sufficiently to clear the mold this fact can be determined by pressing lightly upon the record and perceiving a slight play between the same and the mold. When this relative separation of the record and mold has taken place, so that the record-surface will entirely clear the mold, the platform 7 is again elevated, drawing the mold clear of the record and leaving the latter on the extractor 13. The record is now removed from the extractor and placed upon a suitable tapered support until it reaches the normal temperature. By effecting this further cooling of the record when in engagement with a tapered support, as explained, the record does not become warped or lose its shape. The mold is now removed from the platform 7, and the explained operations are repeated. It will be understood in practice that five or six of the extracting mechanisms are arranged in the same framework under the attention of a single operator, so that by the time the platform of the sixth extracting mechanism, for example, is dropped in place the record in the first mold will have contracted sufficiently to be withdrawn. In this way the entire time of the operator can be occupied in the use of the apparatus.

Having now described my invention, what I claim as new therein, and desire to secure by Letters Patent, is as follows:

1. In an apparatus for extracting phonograph-records from molds, a mold or matrix adapted to contain a hollow record, a tapering extractor adapted to engage the bore of said record and means for cooling said extractor, whereby the record is contracted so as to bind on the extractor and clear the mold, substantially as described.

2. In an apparatus for extracting phonograph-records from molds, a mold or matrix adapted to contain a hollow record, a tapering extractor, and mechanism for producing relative longitudinal movement of said mold and extractor, whereby the extractor enters the bore of the record, engages it and withdraws it from the mold, substantially as described.

3. In an apparatus for extracting phonograph-records from molds, in combination, a hollow mold or matrix, an extractor, and means for cooling said extractor, said extractor and mold being carried on supports which are movable with respect to each other, substantially as set forth.

4. Extracting mechanisms for the purposes described, comprising in combination, an artificially-cooled extractor over which is engaged a phonograph-record within a mold, and means for effecting a relative longitudinal separation of the mold and record, substantially as set forth.

5. Extracting apparatus for the purpose described, comprising in combination, an artificially-cooled extractor, and a platform having an opening therein, movable longitudinally with respect to the extractor, substantially as set forth.

6. Extracting apparatus for the purpose described, comprising in combination, an artificially-cooled extractor, a platform having an opening therein, movable vertically longitudinally with respect to the extractor, and means for locking the platform in position above the extractor, substantially as set forth.

7. Extracting apparatus for the purpose described, comprising in combination, an artificially-cooled extractor, a pair of guide-rods arranged diametrically with respect to the extractor, and a platform having an opening therein, movable on said guide-rods longitudinally with respect to the extractor, substantially as set forth.

8. Extracting apparatus for the purpose described, comprising in combination, an artificially-cooled extractor, a pair of guide-rods arranged diametrically with respect to the extractor, a platform having an opening therein, movable on said guide-rods and longitudinal with respect to the extractor, and means for locking the platform normally above the extractor, substantially as set forth.

9. Extracting apparatus for the purpose described, comprising in combination, a hollow extractor, means for circulating cooling-water therein, and a platform having an opening and longitudinally movable with respect to the extractor, substantially as set forth.

This specification signed and witnessed this 24th day of February, 1903.

DAVID A. DODD.

Witnesses:
J. F. RANDOLPH,
JNO. ROBT. TAYLOR.